United States Patent
Nohmi

(10) Patent No.: US 9,618,382 B2
(45) Date of Patent: Apr. 11, 2017

(54) DEVICE FOR WEIGHING A WIDE VARIETY OF INGREDIENTS AND SYSTEM CONFIGURATION OF DEVICE FOR WEIGHING A WIDE VARIETY OF INGREDIENTS

(75) Inventor: Kenji Nohmi, Kitakyushu (JP)

(73) Assignee: Yubaru techno group co., ltd, Kitakyushu-Shi, Fukuoka (JP)

( * ) Notice: Subject to any disclaimer, the term of this patent is extended or adjusted under 35 U.S.C. 154(b) by 94 days.

(21) Appl. No.: 14/130,630

(22) PCT Filed: Jul. 4, 2012

(86) PCT No.: PCT/JP2012/067034
§ 371 (c)(1),
(2), (4) Date: Mar. 3, 2014

(87) PCT Pub. No.: WO2013/005754
PCT Pub. Date: Jan. 10, 2013

(65) Prior Publication Data
US 2014/0190755 A1    Jul. 10, 2014

(30) Foreign Application Priority Data

Jul. 5, 2011 (JP) ................................ 2011-149466

(51) Int. Cl.
*G01G 13/02* (2006.01)
*G01G 13/06* (2006.01)
(Continued)

(52) U.S. Cl.
CPC .......... *G01G 13/248* (2013.01); *G01G 13/02* (2013.01); *G01G 19/32* (2013.01)

(58) Field of Classification Search
CPC .. B65B 1/32; B65B 1/34; B65B 37/18; G05D 11/04; G01G 11/04; G01G 11/08;
(Continued)

(56) References Cited

U.S. PATENT DOCUMENTS 4,733,971 A * 3/1988 Pratt ................... A01K 5/0216
141/107
4,815,042 A * 3/1989 Pratt ................... A01K 5/0216
141/104

(Continued)

FOREIGN PATENT DOCUMENTS

EP          0878695 A2 * 11/1998  ............. G01G 13/02
WO    WO 0073748 A1 * 12/2000  ............. G01G 13/08

*Primary Examiner* — Randy Gibson
(74) *Attorney, Agent, or Firm* — patenttm.us

(57) ABSTRACT

Provided is a device for weighing a wide variety of ingredients and a system configuration of the device for weighing a wide variety of ingredients, the device weighing and feeding several types of ingredients when cup noodles such as instant noodles are packed with the ingredients in a cup. A space-saving and easily maintainable device for weighing a wide variety of ingredients, wherein powdery and granular starting materials (A, B) are individually stored in a first starting material hopper (2) and a second starting material hopper (3), gradually sent out to the downstream side, weighed, discharged to a first chute (10) and a second chute (11), and supplied to a cup-filling unit (23), and one series from the first starting material hopper (2) to the first chute (10) and one series from the second starting material hopper (3) to the second chute (11) are formed vertically parallel in the shape of a staircase from the upstream side to the downstream side. The device can mix a wide variety of ingredients, improves workability by the size and weight reduction of the starting material hoppers, and achieves space saving resulting from the reduction of floor space to half, and easier cleaning.

6 Claims, 6 Drawing Sheets

(51) Int. Cl.
*G01G 13/24* (2006.01)
*G01G 19/32* (2006.01)

(58) Field of Classification Search
CPC .... G01G 11/086; G01G 13/02; G01G 13/248; G01G 19/32; G01G 21/28; G01G 13/06; G01G 13/08; B65G 65/40
USPC ........................................ 141/83; 177/59, 116
See application file for complete search history.

(56) References Cited

U.S. PATENT DOCUMENTS

| | | | | |
|---|---|---|---|---|
| 4,945,957 A * | 8/1990 | Kardux | ............... | B65B 1/34 141/128 |
| 4,983,090 A * | 1/1991 | Lehmann | ............... | B65G 47/20 198/535 |
| 5,148,943 A * | 9/1992 | Moller | ............... | B29C 47/92 177/50 |
| 5,460,209 A * | 10/1995 | Jandura | ............... | G01G 13/024 141/104 |
| 5,621,194 A * | 4/1997 | Koyama | ............... | G01G 19/393 134/104.1 |
| 5,651,401 A * | 7/1997 | Cados | ............... | B65B 1/36 141/103 |
| 5,765,655 A * | 6/1998 | Tatsuoka | ............... | G01G 19/393 177/105 |
| 6,059,144 A * | 5/2000 | Vollmar | ............... | B29C 47/10 222/135 |
| 6,188,029 B1 * | 2/2001 | Miyamoto | ............... | G01G 19/393 177/105 |
| 6,365,845 B1 * | 4/2002 | Pearce | ............... | G01G 21/28 177/180 |
| 6,474,372 B2 * | 11/2002 | Sanderson | ............... | B65B 1/32 141/104 |
| 8,974,109 B2 * | 3/2015 | Gauvin | ............... | B01F 3/18 366/141 |
| 2002/0113080 A1 * | 8/2002 | Beal | ............... | B01F 3/18 222/1 |
| 2004/0060367 A1 * | 4/2004 | Bergman | ............... | B65B 1/32 73/861.41 |
| 2010/0089667 A1 * | 4/2010 | Inauen | ............... | G01G 13/024 177/59 |
| 2014/0048172 A1 * | 2/2014 | Tomioka | ............... | B65B 1/32 141/83 |

* cited by examiner

FIG.1

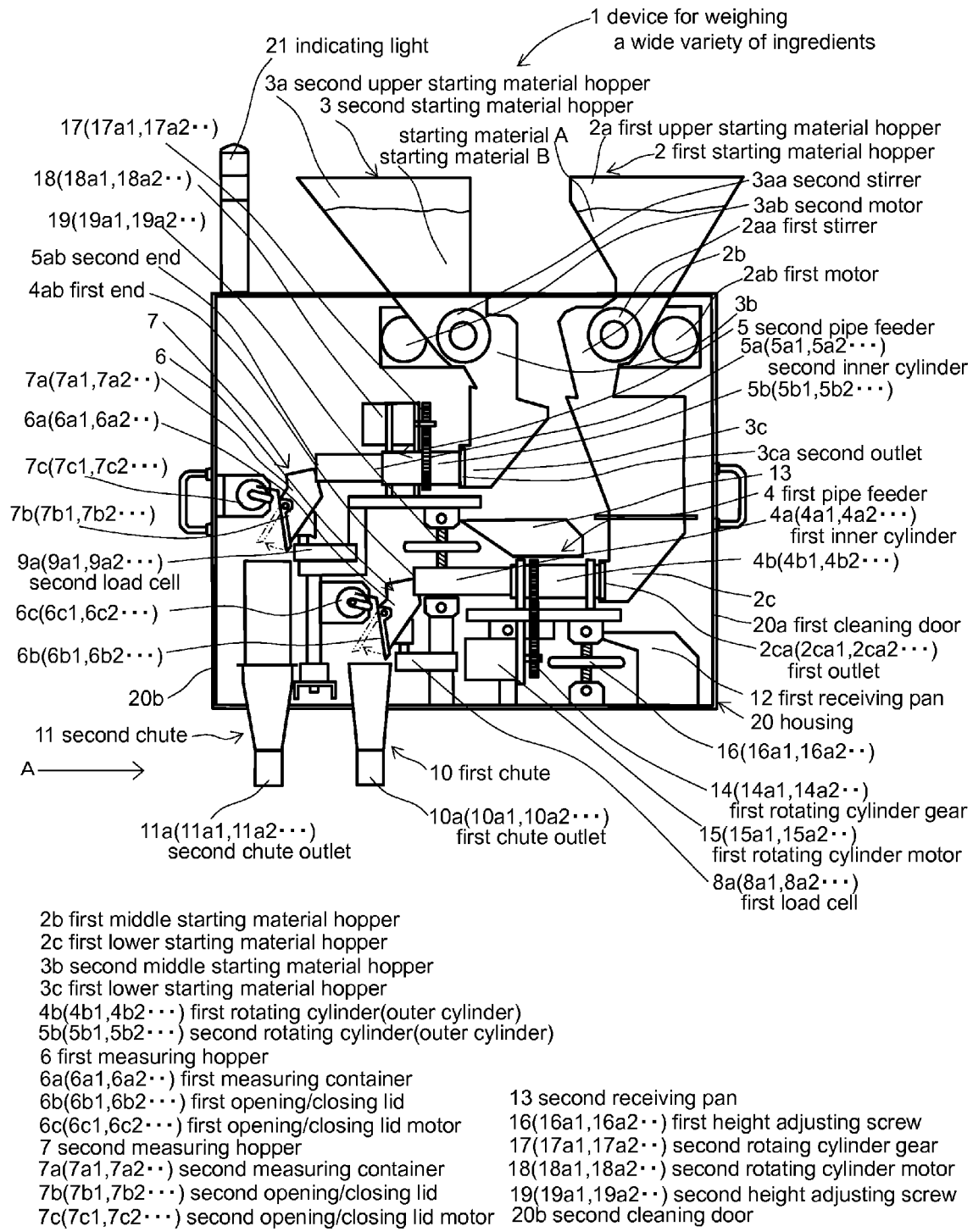

2b first middle starting material hopper
2c first lower starting material hopper
3b second middle starting material hopper
3c first lower starting material hopper
4b(4b1,4b2···) first rotating cylinder(outer cylinder)
5b(5b1,5b2···) second rotating cylinder(outer cylinder)
6 first measuring hopper
6a(6a1,6a2··) first measuring container
6b(6b1,6b2···) first opening/closing lid
6c(6c1,6c2···) first opening/closing lid motor
7 second measuring hopper
7a(7a1,7a2··) second measuring container
7b(7b1,7b2···) second opening/closing lid
7c(7c1,7c2···) second opening/closing lid motor
13 second receiving pan
16(16a1,16a2··) first height adjusting screw
17(17a1,17a2··) second rotaing cylinder gear
18(18a1,18a2··) second rotating cylinder motor
19(19a1,19a2··) second height adjusting screw
20b second cleaning door A arrow figure shown in FIG.1

FIG. 3
FIG. 3-a
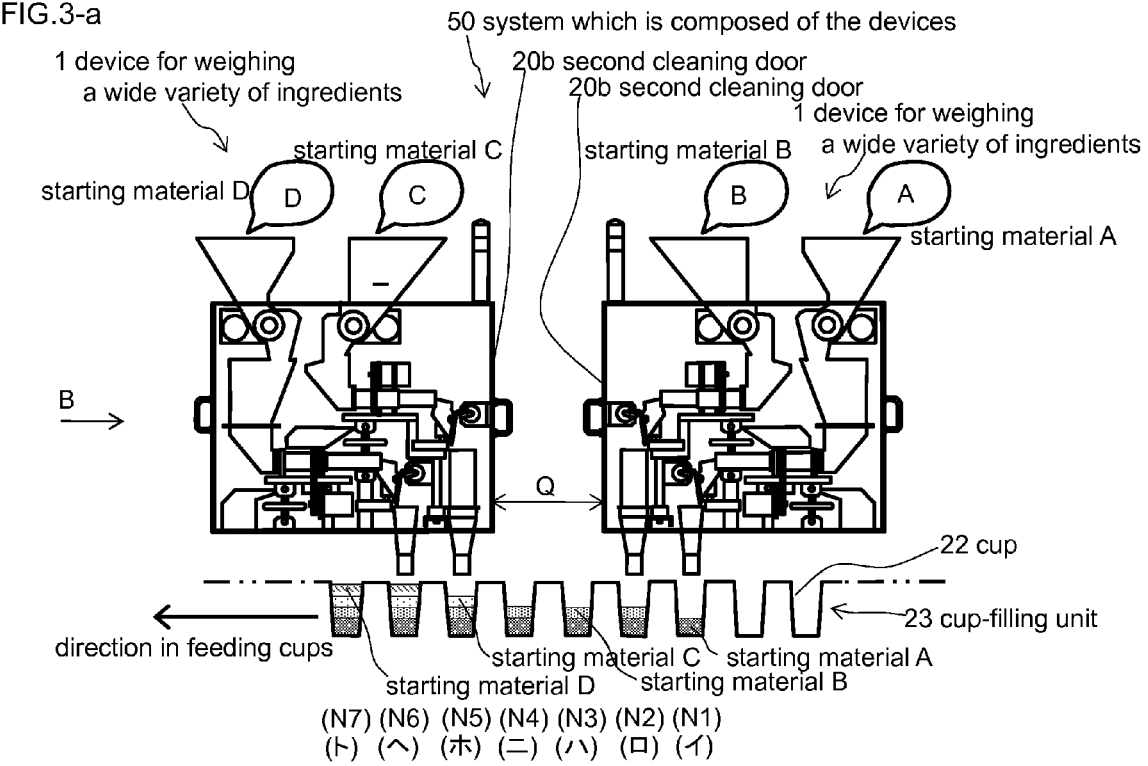
FIG. 3-b
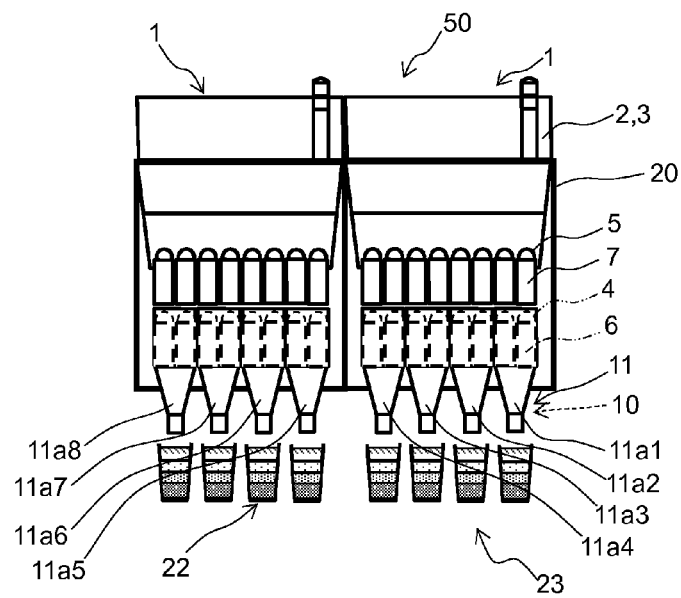
B arrow figure shown in FIG3-a

FIG. 4
FIG.4-a
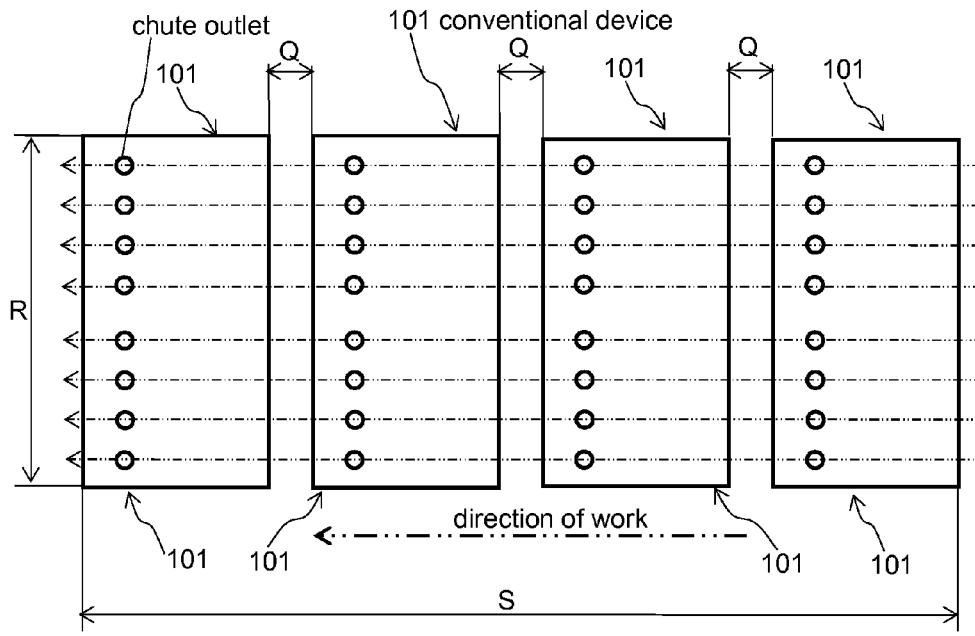
conventional manufacturing line shown in plain view
(eight lines shown in feeding four kinds of starting material)
FIG.4-b
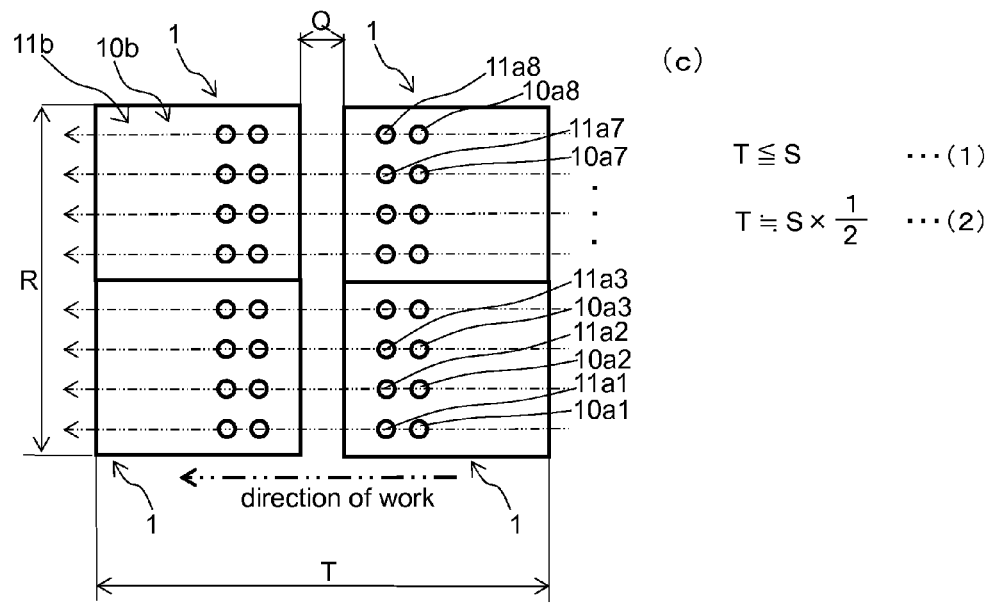
$T \leqq S \quad \cdots (1)$
$T \fallingdotseq S \times \dfrac{1}{2} \quad \cdots (2)$
the present invention's manufacturing line shown in plain view
(eight lines shown in feeding four kinds of starting material)

FIG.5
Fig.5-a
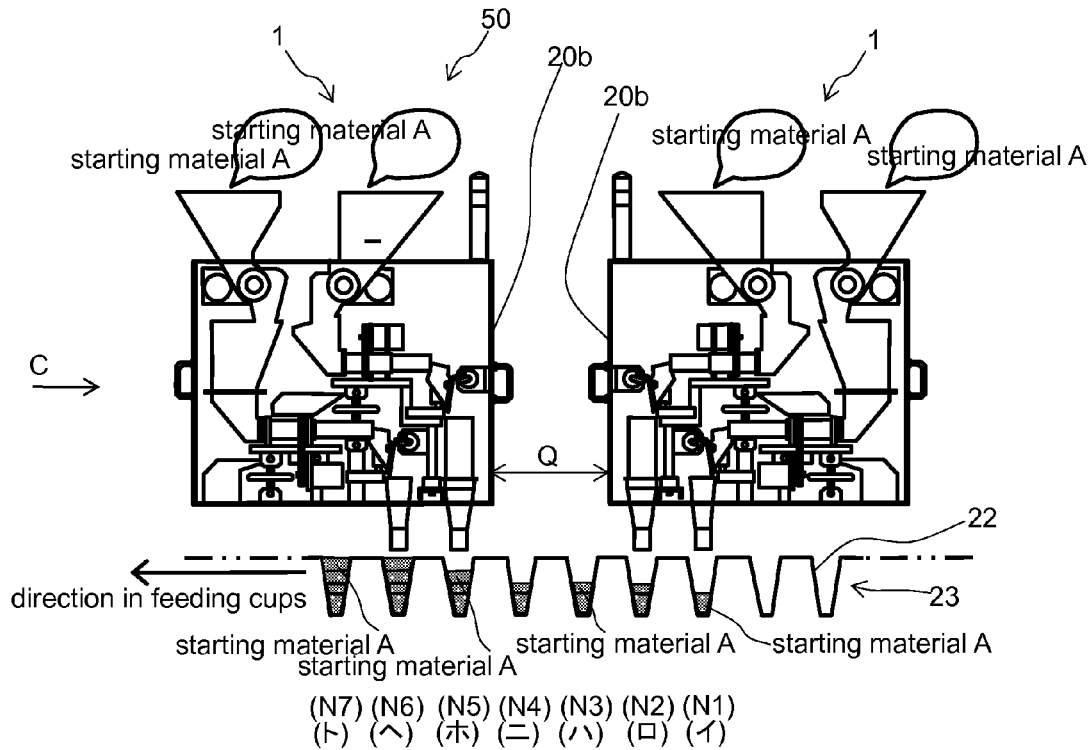
FIG.5-b
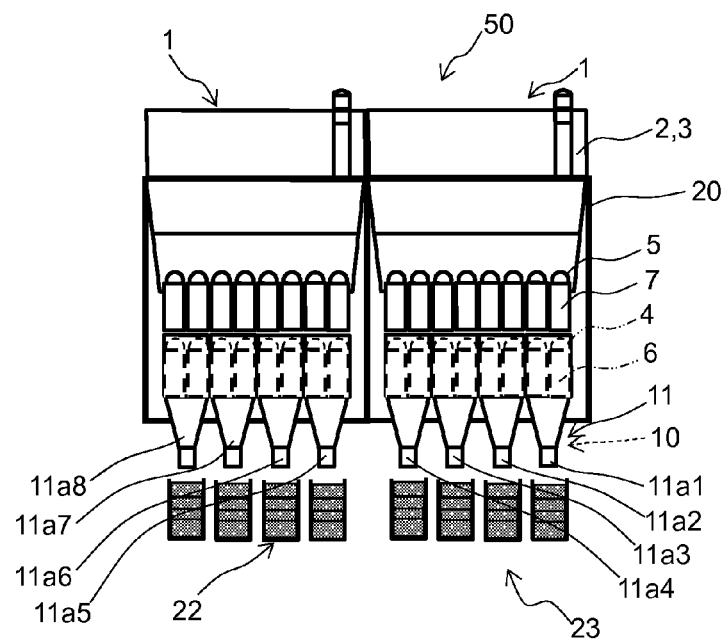
B arrow figure FIG.5-a

DEVICE FOR WEIGHING A WIDE VARIETY OF INGREDIENTS AND SYSTEM CONFIGURATION OF DEVICE FOR WEIGHING A WIDE VARIETY OF INGREDIENTS

FIELD OF THE INVENTION

The present disclosure relates to a device for weighing a wide variety of ingredients, and a system configuration of two of the devices for weighing a wide variety of ingredients, and more particularly, to the device for feeding and weighing the ingredients as starting material in filling the cups with cup-typed instant noodles together with some variety ingredients, and in filling the small packages with Furikake as topping for rice in powdered and granular shape.

BACKGROUND OF THE INVENTION

The background technology disclosed in JP2001124619A is explained as follows. FIG. 6 is a schematic views to explain a conventional device for weighing a wide variety of ingredients. In filling small packages with ingredient of powder soup for instant noodles and so on, dried food, Furikake as topping for rice, food sweets, and Ochazuke as greentea rice soup, the device 101 for weighing a wide variety of ingredients is weighing and is mixing the several kinds of starting material. And the device 101 stores the several kinds of starting material of dried and powdered and granular shape in each type.
And the device 101 slowly feeds the starting material by using each kind of feed mechanism.

The device 101 weighs for each type of the starting material, and discharges a predetermined amount of the starting material to a chute for each type. Further, the device 101 mixes the several kind of starting material on the one chute to receive the starting material discharged, and feeds it to the packaging machine. Thus the device 101 is a continuous weighing and feeding device. As shown in FIG. 6, the conventional device for weighing a wide variety of ingredients comprises, the hopper 103 for storing the starting material of powdered and granular shape, having the plural sections of the discharging section 102, set up in a plurality of stages on the bottom side for a kind of starting material, with the lower section that becomes gradually small, the elongated plurality of rotary cylinders 105, which are connected via the bearing to the discharging section 102 of the hopper 103, which make the starting material of powdered and granular shape flowing out from the hopper 103 to move gradually to the lower side, and which are set up in a plurality of stages inclined, a plurality of containers 107, which are set up in a plurality of stages, are storing temporarily the starting material in powdered and granular shape being fed out from the rotating cylinder 105, and are having a discharging damper 109 in obliquely downward, a weighing device 108 which weighs together with the cover the starting material in powdered and granular shape being input in to the container 107, and which have a plurality of load cell set up in plural stages.

A plurality of motor mechanisms 106 are set up in plural stages, and shift the rotary speed of the rotary cylinder 105 to lower-speed rotation when the measurement signal of a weighing device 108 has approached a target value after having made the rotary cylinder 105 to rotate in high-speed, a plurality of the damper opening and closing mechanisms 110 which are set up in the plural stages, and open the discharging damper 109 of the container 107 based on the measurement signal of the weighing machine 108 and a chute 111 which flows down the predetermined amount of the starting material of powdered and granular shape discharged from the container 107, and the chute 111 which supplies a mixed plurality of the starting material discharged to the packaging machine. Accordingly, this device can accurately weigh, mix, feed a plurality of the starting material of powdered and granular shape, and be applied to the conventional packaging line.

EP 1 764 592 A discloses a combinational weighing technique configured for a combinational weighing or a combinational counting of a weighed article. In a selecting step, since at least one large input weighing device is selected without any exception, therefore a target weight value is substantially reduced. This allows an equally dividing operation over the reduced target weight by two small input weighing devices to be performed. JP 4048235 B2 discloses a weighed object dispensing mechanism capable of continuously performing an operation to dispensing and discharge stored weighed objects by a specified amount. The mechanism comprises a hopper which stores the weighed objects and a plurality of rotating tubes which communicate with the discharge part of the hopper and are disposed aslant in a plurality of stages in vertical direction to move the weighed objects discharged from the hopper downward.

However, the continuous weighing and feeding device in JP2001124619 A comprise the hopper, the rotary cylinder, the container, the weighing device, the motor mechanism, the damper opening and closing mechanism for opening the discharging damper of the container, and the chute.

And by mixing four kinds of starting material after assembling the four sets of the continuous weighing and feeding device, it must stack the portion of the multi-feeder, and it has a structure for having the load cell on the upper side, and suspending the container. Hereby, it is possible to weigh with high accuracy, mix several kind of the starting material, and package those. But there is a difficult issue in weighing precision, and a difficult issue in the maintenance for cleaning of the parts which constitute the passage of the starting material of powdered and granular shape. In view of the above problems, it is an object of the present disclosure to provide a device for weighing a wide variety of ingredients for being able to mix a wide variety of ingredients, for improving the workability in reducing size and doing weight saving of the feed hopper, for reducing ½ of floor space, and for achieving the ease of cleaning.

SUMMARY OF THE INVENTION

A device for weighing a wide variety of ingredients according to a first aspect of the present disclosure is what is a space-saving and easily maintainable device for weighing a wide variety of ingredients, wherein at least one kind or several kind of powdery and granular starting material A, B are individually stored to a first starting material hopper 2 and a second starting material hopper 3, gradually sent out to the downstream side from the first starting material hopper 2 and the second starting material hopper 3 which set up on the upstream side, weighed, and discharged the predetermined amount to a first chute 10 on the downstream side of the first starting material hopper 2 and a second chute 11 on the downstream side of the second material hopper 3, and the starting material is supplied to a cup-filling unit 23, and one series from the first starting material hopper 2 to the first chute 10 and one series from the second starting material hopper 3 to the second chute 11 are formed vertically parallel in the shape of a staircase from the upstream side to the downstream side comprising a plurality of the first outlet and a plurality of the second outlet which is provided below the starting hopper and the second starting hopper, the plurality of the first pipe feeder and the plurality of the second pipe feeder in the shape of the rotary cylinder slanted downward to the downstream side, wherein connected corresponding to the plurality of the first outlet and the plurality of the second outlet, and provided continuously corresponding so as to have the starting material flow to the downstream side, the plurality of the first measuring hopper with the lid and the plurality of the second measuring hopper with the lid, wherein the first pipe feeder and the second pipe feeder are provided at each end of the downstream side, the plurality of the first measuring sensor and the plurality of the second measuring sensor are provided, wherein respectively the plurality of the first measuring hopper and the plurality of the second measuring hopper are supported from below, and weigh the weight of the first measuring hopper and the second measuring hopper with the weight of the starting material, the first chute and the second chute provided respectively on the downstream side of the first measuring hopper and the second measuring hopper.

A device for weighing a wide variety of ingredients according to a second aspect of the present disclosure is what is a device for weighing a wide variety of ingredients, comprises, wherein the first starting hopper and the second starting hopper is provided respectively as the first upper starting hopper, the second upper starting hopper, the first middle starting hopper, the second middle starting hopper, the first lower starting hopper, and the second lower starting hopper, wherein the lower hopper and the second lower hopper is provided respectively the plurality of the first outlet and the plurality of the second outlet, wherein the pipe feeder is provided continuously to each of the plurality of the first outlet and the second outlet, and the second pipe feeder is provided being away from and being overlapped above the first pipe feeder.

A device for weighing a wide variety of ingredients according to a third aspect of the present disclosure is what is a device for weighing a wide variety of ingredients and comprises the one first chute which is integrated with respect to two adjacent hoppers in the plurality of the first measuring hopper; and the one second chute which is integrated with respect to two adjacent hoppers in the plurality of the second measuring hopper.

A system configuration of a device for weighing a wide variety of ingredients according to a fourth aspect of the present disclosure comprising, wherein a system configuration of the device for weighing a wide variety of ingredients is setup face to face with the cleaning door of the two device for weighing a wide variety of ingredients; and supplies the starting material to the cup-filling units, wherein the pair of device for weighing a wide variety of ingredients are disposed face to face with narrow interval of 20~50 cm; and the hopper, the pipe feeder, and the measuring hopper is removable easily for cleaning them.

A system configuration of the device for weighing a wide variety of ingredients, according to a fifth aspect of the present disclosure comprises, wherein the first cleaning door and the second cleaning door is provided on the housing of the device for weighing a wide variety of ingredients on the back and the forth for the flowing direction of the starting material; and in the each first cleaning door and the each second cleaning door of a pair of the devices for weighing a wide variety of ingredients, any pair of the first cleaning door and the first cleaning door, or the second cleaning door and the second cleaning door is set up serially for the flowing direction, and furthermore, is set up parallel for the flowing direction.

According to the present disclosure, the device for weighing a wide variety of ingredients can achieves floor-space saving because the first starting material paths of the one first series of the first starting material paths defined from the first starting material hopper 2 to the first chutes 10 and the second starting material paths of the one second series of the second starting material paths defined from the second starting material hopper 3 to the second chutes 11, respectively, are formed vertically parallel in the shape of a staircase from the upstream side to the downstream side.

In addition, as compared to the measuring hopper which is hung by a hanger of long arm-shape from the load cell as shown in JP2001124619 A, because in the device for weighing a wide variety of ingredients the measuring sensor using a load cell is placed beneath the each series hopper and the measuring hopper is placed above the measuring sensor, the measuring sensor can be fixed firmly without wobbling and can weigh precisely.

In addition, since the size of the starting material hopper is limited in terms of weight in case of women as operators, the pipe feeders could not be configured only to eight lines, but now it is possible to do multi-lines of 16 lines equivalent, since it was devised to be arranged in parallel the widget.

Further, according to arrange in parallel and vertically for face to with the cleaning door of the two device for weighing a wide variety of ingredients, it was configured in the four widget and achieved space saving resulting from the reduction of floor space to half, and easier cleaning.

Furthermore, the device for weighing a wide variety of ingredients and a system configuration of the device for weighing a wide variety of ingredients of the present disclosure is a space-saving and easily maintainable device for weighing a wide variety of ingredients, and improves workability by the size and weight reduction of the starting material hoppers.

According to the present disclosure, since one chute is provided for two pipe feeders, it is possible to reduce the diameter of the pipe, and manufacture with high speed and high dimensional accuracy in comparison with the case of which is provided one chute for one pipe feeder.

BRIEF DESCRIPTION OF DRAWINGS

FIG. 1 is an elevation view showing a schematic view of a device for weighing a wide variety of ingredients to explain an embodiment of the present disclosure;

FIG. 3 is a schematic view showing a system configuration of the device for weighing a wide variety of ingredients to explain an embodiment of the present disclosure, FIG. 3-a is an elevation view, FIG. 3-b is a side elevational view of B-arrow figure shown in FIG. 3-a;

FIG. 4 is a plane view showing a system with the device for weighing a wide variety of ingredients to explain an embodiment of the present disclosure, FIG. 4-a is a plane view showing the conventional production line, FIG. 4-b is a plane view showing a production line of the present disclosure, and FIG. 4-c is the equation (1) (2) for describing the space-saving;

FIG. 5 is a schematic view showing a system with the device for weighing a wide variety of ingredients to explain the production line of single starting material, FIG. 5-*a* is a elevation view, FIG. 5-*b* is a side elevational view of C-arrow figure shown in FIG. 5-*a*;

DETAILED DESCRIPTION OF EMBODIMENT

A device for weighing a wide variety of ingredients according to an embodiment of the present disclosure will be described below reference to the attached drawings.

Figure 2:
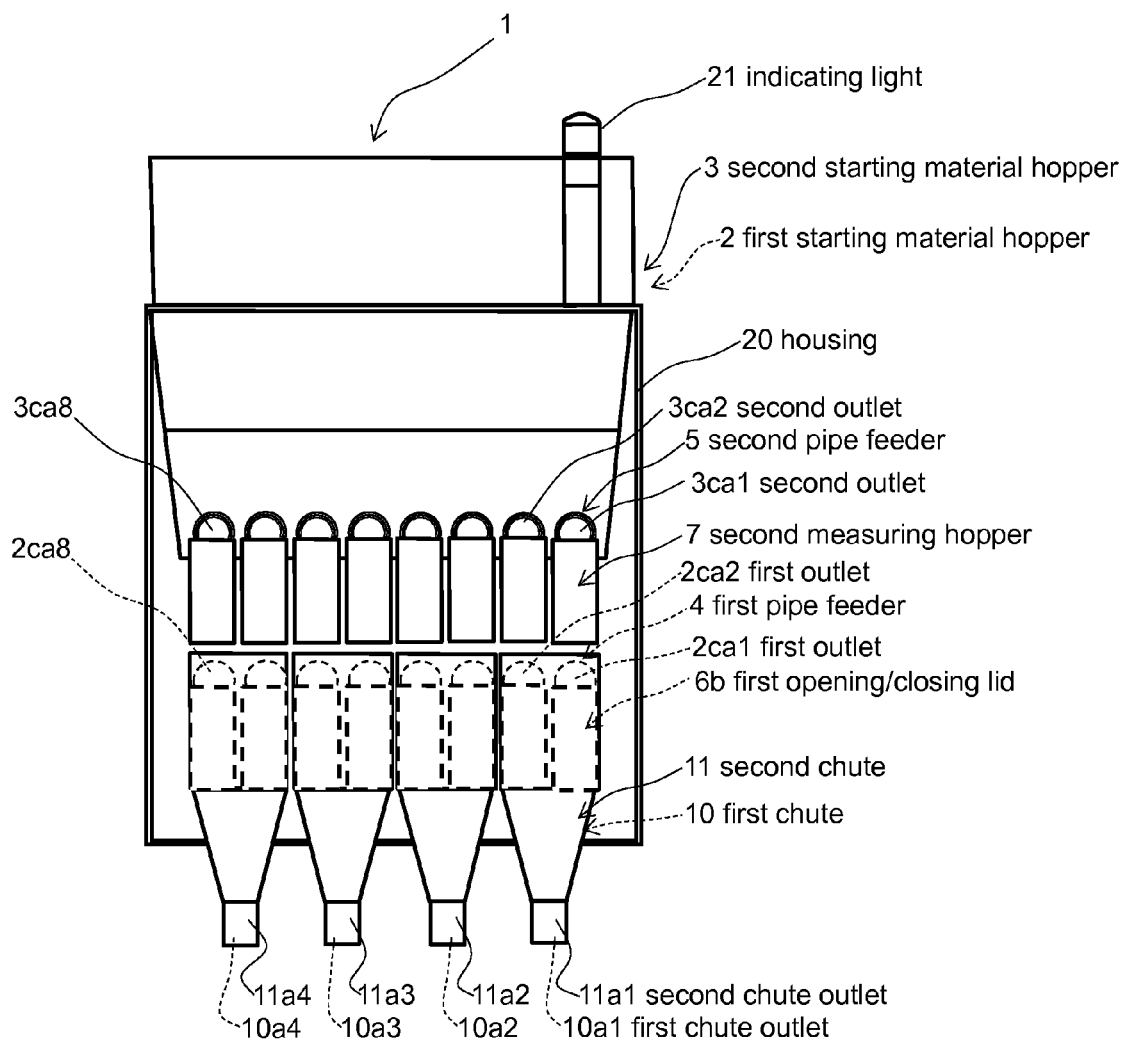
FIG. 2 is a side elevational view of A-arrow figure shown in FIG. 1, showing a schematic view of a device for weighing a wide variety of ingredients to explain an embodiment of the present disclosure.
Figure 6:
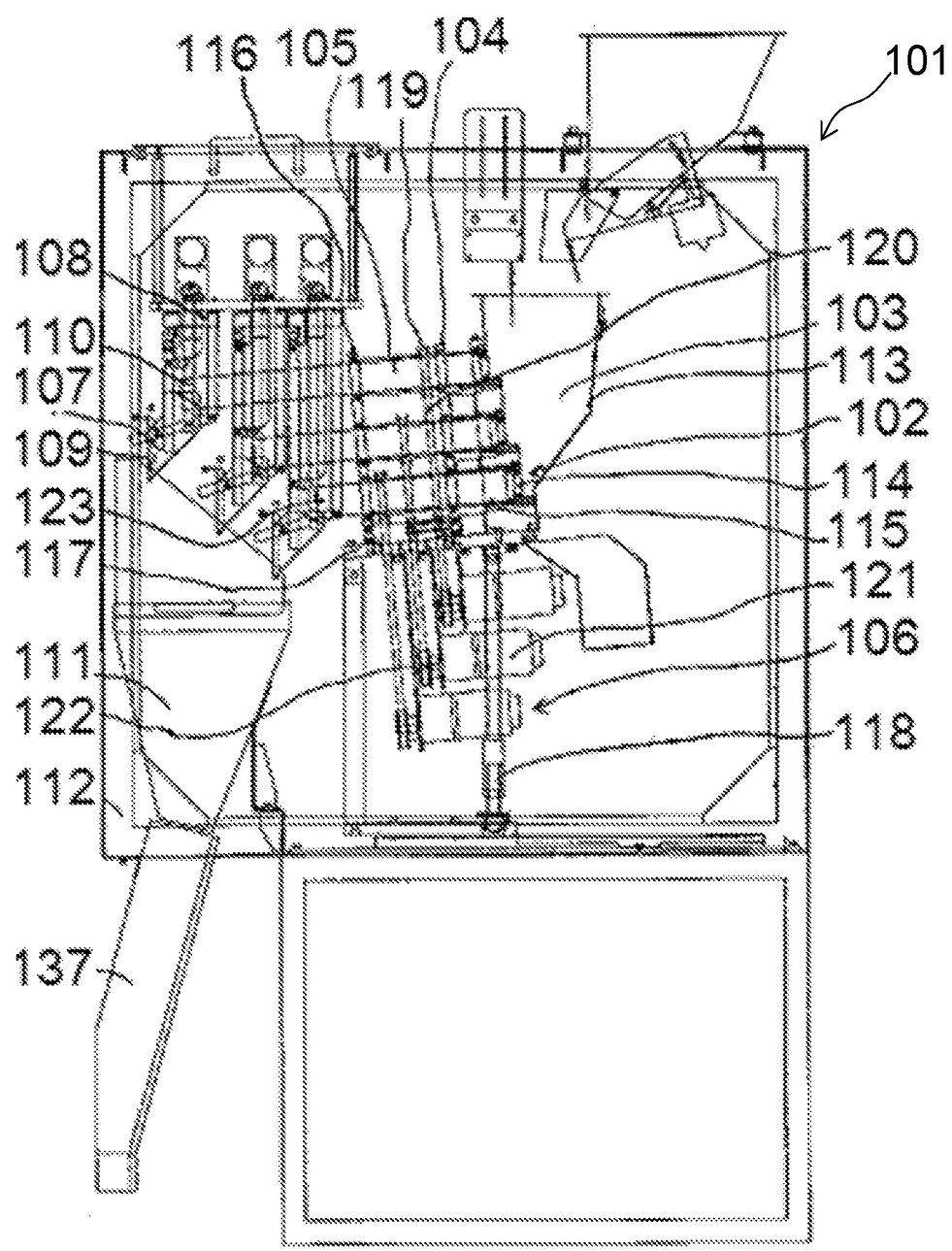
FIG. 6 is a elevation view showing a schematic view of a device for weighing a wide variety of ingredients to explain a conventional embodiment.

FIG. 1 is an elevation view showing a schematic view of a device for weighing a wide variety of ingredients to explain an embodiment of the present disclosure. FIG. 2 is a side elevational view of A-arrow figure shown in FIG. 1, showing a schematic view of a device for weighing a wide variety of ingredients to explain an embodiment of the present disclosure. As shown in FIG. 1 and FIG. 2, the device 1 for weighing a wide variety of ingredients is a weighing device of a wide variety of ingredients capable, a space-saving, and maintenance of easy type. And there is the case of storing the starting material A of the same type in powdered and granular shape to the first starting material hopper 2 and the second starting material hopper 3, or the case of storing the starting material A to the first starting material hopper 2 and storing the starting material B of the different types with the starting material A in powdered and granular shape to the starting material hopper 3, but they have the same configuration. In FIG. 1, it is described that in the case for storing the different kind of the first and second starting material A, B to the respective first and second starting material hopper 2 and 3.

At first, individually storing the starting materials A, B to the two starting material hoppers of the first starting material hopper 2 and the second starting material hopper 3, gradually sending the starting material A, B out to the downstream side in beneath the FIG. 1 from the first starting material hopper 2 and the second starting material hopper 3 which is set up on the upstream side in above the FIG. 1, weighed, discharged the predetermined amount to the first chute 10 on the downstream side of the first starting material hopper 2 and the second chute 11 on the downstream side of the second material hopper 3, and supplied the starting material to a cup-filling unit 23 (see FIG. 3).

And the device 1 for weighing a wide variety of ingredients of a wide variety of ingredients capable type, a space-saving type, and easy maintenance type comprise one first series of starting material paths defined from the first starting material hopper 2 to the first chutes 10 and one second series of starting material paths defined from the second starting material hopper 3 to the second chute 11 are formed vertically parallel in the shape of a staircase from the upstream side to the downstream side. And the first starting material hopper 2 has the first upper starting material hopper 2*a*, the first middle starting material hopper 2*b*, and the first lower starting material hopper 2*c*. And the second starting material hopper 3 has the second upper starting material hopper 3*a*, the second middle starting material hopper 3*b*, and the second lower starting material hopper 3*c*. Incidentally, in the Figure, the one first series of starting material paths connected to the second starting material hopper 3 is disposed above the one second series of starting material paths connected to the first starting material hopper 2.

The first lower starting material hopper 2*c* and the second lower starting material hopper 3*c* on the lower part have the plurality, for example, eight of the first outlet 2*ca* (2*ca*1, 2*ca*2 . . . ) and the second outlet 3*ca* (3*ca*1, 3*ca*2 . . . ). The eight of the first pipe feeder 4, 4 . . . and the eight of the second pipe feeder 5, 5 . . . in the shape of rotary cylinder slanted downward to the downstream side, corresponding respectively to the eight of the first outlet 2*ca* (2*ca*1, 2*ca*2 . . . ) and the eight of the second outlet 3*ca* (3*ca*1, 3*ca*2 . . . ) provide continuously the starting material A, B so as to flow to the downstream side.

The second pipe feeders 5, 5 are provided being away from and being overlap above the first pipe feeders 4, 4.

And since the pipe feeders are in the shape of the rotary cylinders, the pipe feeders are rotated by driving means such as a motor, the pipe feeders can deliver gradually the starting material to the downstream side direction. In addition, in the present embodiment, but it is not especially specified, for example, it is specified the pipe feeder as the diameter of 25~65 mm for each series of starting material paths provided in parallel and vertically, further, it may be a different diameter, but not limited thereto.

The eight of the first pipe feeders 4, 4 . . . and the eight of the second pipe feeders 5, 5 . . . are provided the first inner cylinder 4*a* (4*a*1, 4*a*2 . . . ), the first outer cylinder 5*a* (5*a*1, 5*a*2 . . . ), the second inner cylinder 5*a* (5*a*1, 5*a*2 . . . ), and the second outer cylinder 5*b* (5*b*1, 5*b*2 . . . ). And the inner cylinders 4*a*, 4*b* and the outer cylinders 5*a*, 5*b* rotate synchronized, and the inner cylinders 4*a*, 5*a* are fitted and rotate synchronized removably the outer cylinder 4*b*, 5*b*. And eight of the first measuring hoppers 6 and eight of the second measuring hoppers 7, respectively, with the first and second opening/closing lid 6*b*, 7*b* are provided on the end 4*ab* (4*ab*1, 4*ab*2 . . . ) of the first inner cylinder 4*a* of the first pipe feeder 4, and on the end 5*ab* (5*ab*1, 5*ab*2 . . . ) of the second inner cylinder 5*a* of the pipe feeders 5.

Then a first measuring container 6*a* (6*a*1, 6*a*2 . . . ) and a second measuring container 7*a* (7*a*1, 7*a*2 . . . ), the first opening/closing lid 6*ab* (6*ab*1, 6*ab*2 . . . ), and the second opening/closing lid 7*ab* (7*ab*1, 7*ab*2 . . . ) is are provided, respectively, on the first measuring hopper 6, 6 and the second measuring hopper 7, 7. And the load cell 8*a* (8*a*1, 8*a*2),9*a* (9*a*1, 9*a*2) is provided so as to hold beneath the first measuring hopper 6 and the second measuring hopper 7. And eight of the first measuring sensor 8*a* (8*a*1, 8*a*2) and eight of second measuring sensor 9*a* (9*a*1, 9*a*2) which weigh the first measuring hopper 6 and the second measuring hopper 7 with the weight of the starting material A, B, is provided so as to hold beneath eight of the first measuring hoppers 6, 6 and eight of the second measuring hoppers 7, 7.

The first load cells 8*a* (8*a*1, 8*a*2) and the second load cells 9*a* (9*a*1, 9*a*2) weigh individually the weight of the measuring hopper 6, 6, 7, 7 with the weight of the starting material A, B. And the first chutes 10, 10 and the second chutes 11, 11 are provided, respectively, on the downstream side of a plurality of the measuring hopper 6, 7. And the first chute outlets 10*b* (10*b*1, 10*b*2, 10*b*3, 10*b*4) and the second chute outlets 11*b* (11*b*1, 11*b*2, 11*b*3, 11*b*4) are provided on the end of the first chutes 10, 10 and the second chutes 11, 11. Two of the pipe feeders adjacent are configured to be aggregated into a single chute, here. That is to say, in this case the device for weighing the wide variety of ingredients has four of the chutes and eight of the pipe feeders.

Thus, two types of the starting materials A, B in powdered and granular shape are individually stored to the first starting material hopper 2 and the second starting material hopper 3, and are gradually sent out to the downstream side from the starting material hopper 2, 3, are weighed, are respectively discharged in the predetermined amount to a first chute 10 and a second chute 11, and are supplied to the cups 22 (see FIG. 3).

In addition, a first cleaning door 20a and a second cleaning door 20b are provided on a housing 20 of the device 1 for weighing a wide variety of ingredients on the back and the forth with respect to the flowing direction of the starting material; and each first cleaning door and each second cleaning door of a pair of the devices 1, 1 for weighing a wide variety of ingredients, any pair of the first cleaning door 20a and the first cleaning door 20b, or the second cleaning door 20b and the second cleaning door 20b is set up face to face with respect to the flowing direction, and furthermore, is set up parallel to the flowing direction.

Then, a first height adjusting screw 16 (16a1, 16a2) and a second height adjusting screw 19 (19a1,19a2) is for adjusting an angle of gradient of the first pipe feeder 4 and the second pipe feeder 5, and can adjust the angle of gradient from 0° to 7° to the downstream side. The angle of gradient is not limited thereto, that can be changed accordingly to the design. Further, a first rotating cylinder gear 14 (14a1, 14a2) and a second rotating cylinder gear 17 (17a1, 17a2) is fixed on the periphery of the rotating cylinder 4b, 5b as the outer cylinder of the first pipe feeder 4 and the second pipe feeder 5, and rotates at a predetermined speed by the first rotating cylinder motor 15 (15a1,15a2) and the second rotating cylinder motor 18 (18a1, 18a2). In addition, the gear (not shown with reference numeral) so as to engage the gear fixed on the periphery of the first pipe feeder 4 and the second pipe feeder 5, is provided with the respective rotor shafts (not shown in the figure).

Hereby, as shown in JP 2001124619 A, in comparison with the measuring hopper which is hung by the hanger of long arm-shaped from the load cell, because the device for weighing a wide variety of ingredients is placed the measuring sensor using a load cell beneath the each series hopper and places the measuring hopper above the measuring sensor, the measuring sensor can be fixed firmly without wobbling and can weigh precisely. In addition, since the size of the starting material hopper is limited in terms of weight in case of women as operators, the pipe feeders could not be configured only to eight lines, but it was able to do multilines of 16 lines equivalent, since it was devised to be arranged in parallel the widget. In addition, in the first cleaning door and the second cleaning door, since any pair of the first cleaning door 20a and the first cleaning door 20a, or the second cleaning door 20b and the second cleaning door 20b is set up face to face with respect to the flowing direction, and furthermore, is set up parallel to the flowing direction, it can be arranged a four of the widgets and achieve space saving resulting from the reduction of floor space to half, and easier cleaning.

In addition, since the device for weighing a wide variety of ingredients can achieves floor-space saving resulting from the fact that the one first series of starting material paths defined from the first starting material hopper to the first chute and the one series of starting material paths defined from the second starting material hopper to the second chute are formed vertically parallel in the shape of a staircase from the upstream side to the downstream side, the device can be in space saving typed in the planar view.

Then, the device for weighing a wide variety of ingredients of the present disclosure will be described below about the operation. As shown in FIG. 1 and FIG. 2, the starting material A, B which stored in the first starting material hopper 2 and the second starting material hopper 3, flows to the first upper starting material hopper 2a and the second upper starting material hopper 3a, the first middle starting material hopper 2b, the second starting material hopper 3b, the first lower starting material hopper 2c, and the second lower starting material hopper 3c. And a first stirrer 2aa and a second stirrer 3aa is provided between the first/second upper starting material hopper 2a, 3a and the first/second starting material hopper 2b, 3b, hereby, the starting material A, B are forcibly send out. In addition, hereby, it is possible that the starting materials A, B prevented from stopping on the way, and the starting materials A, B is advanced to move fluently. The parts in which the starting material flows on the route of the first upper starting material hopper 2a, the second starting material hopper 3a, the first middle starting material hopper 2b, the second middle starting material hopper 3b, the first lower starting material hopper 2c, the second lower starting material hopper 3c, the first pipe feeder 4, the second pipe feeder 5, the first measuring hopper 6, the second measuring hopper 7, and so on, can be removed for cleaning and can easily be removed by opening the first cleaning door 20a and the second cleaning door 20b.

Then, the device 1 for weighing a wide variety of ingredients of the present disclosure will be described below about the production line. FIG. 3 is a schematic view showing a system configuration of the device for weighing a wide variety of ingredients to explain an embodiment of the present disclosure, (a) is an elevation view, (b) is a side elevational view of B-arrow figure shown in (a). As shown in FIG. 3-a and FIG. 3-b, the system configuration 50 of a device for weighing a wide variety of ingredients of a wide variety of ingredients capable, a space-saving, and maintenance of easy type, is configured by providing the space Q between the two devices 1, 1 to the arrow figure direction in the Figure, and is configured by providing the two second cleaning doors 20b opposed at a distance of approximately 30 cm. However, it is possible to configure by providing the two first cleaning door 20a opposed respectively. As just described, by placing the two device for weighing a wide variety of ingredients 1, 1 face to face with a narrow space Q of 20~50 cm which an operator can enter, it is possible to remove easily for cleaning the hopper 2, 3, the pipe feeder 4, 5, the measuring hopper 6, 7, and the chute 10, 11.

In addition, the conventional-typed cup-filling unit 23 is provided beneath the device 1 for weighing a wide variety of ingredients.

In the figure, are gradually send out from the starting material hopper store respectively the starting material A, B, C, and D to the downstream side, are weighed, are respectively discharged in the predetermined to a plurality of the chutes 10 (10a1, 10a2 . . . ), 11 (11a1, 11a2 . . . ), are supplied to the cup 22 of the cup-filling unit 23 and are mixed.

FIG. 4 is a plane view showing a system configuration of the device for weighing a wide variety of ingredients to explain an embodiment of the present disclosure, FIG. 4-a is a plane view showing the conventional production line, FIG. 4-b is a plane view showing a production line of the present invention, and FIG. 4-c is the equation (1) (2) for describing the space-saving. As shown in FIG. 4-a, for example, the conventional device for weighing a wide variety of ingredients 101 are provided the four devices 101 in the production line. And as the method of arranging the four devices for weighing a wide variety of ingredients, the space Q for the flowing direction is provided ahead of the device 101 for weighing a wide variety of ingredients. And further, the space Q is provided. And furthermore, the space Q is provided in sequence ahead of the device 101. Hereby, the production line are formed the 32 places of the chute outlets consisted of 4 sets of 8 lanes. In this case, the installation length of the production line is the length S. Then, the configuration for production line as described above will be described using the device for weighing a wide variety of ingredients of the present disclosure.

As shown in FIG. 4-*b*, the two devices for weighing a wide variety of ingredients are provided in left and right with respect to the flow direction of work. And the two of the devices are configured in parallel by providing the space Q ahead of the devices for weighing a wide variety of ingredients. Hereby, the production line are formed the 32 places of the chute outlets consisted of 4 sets of 8 lanes. In this case, the installation length of the production line is the length T. As shown in FIG. 4-*c*, the relationship as shown below is given, the equation (1) T≤S, the equation (2) T≈S×½. That is, the width R of the width direction for the flow direction of the product in the present production line is substantially similar with the conventional line also. The length direction is respectively the length T and the length S, and the installation area of the present disclosure is smaller than the installation area of the convention art. Hereby, the space efficiency is very good in the present configuration.

Next, the configuration of the device does not change, the configuration will be described in case of one type of the starting material. FIG. 5 is a schematic view showing a system configuration of the device for weighing a wide variety of ingredients to explain the production line of single starting material, FIG. 5-*a* is a elevation view, FIG. 5-*b* is a side elevational view of C-arrow figure shown in FIG. 5-*a*. The different point between the system configuration 50 of a device for weighing a wide variety of ing ingredients shown in FIG. 3 and the system configuration 50 of a device for weighing a wide variety of ingredients shown in FIG. 5 is a point using one type starting material although using the same configuration of the devices. Consequently, in the same numerals as the system configuration 50 shown in FIG. 3, the description thereof is omitted in the numerals shown in FIG. 5. Hereby, the space per a device for weighing a wide variety of ingredients is same, but the producing capability has been doubled. That is, it is possible to produce by space-saving of ½ of floor space, further, the producing capability has been doubled if there were the production line of the same installation area with the convention area. In addition, since it is possible to be half the width of the starting material hopper in the top, it can be lifted up easily by the women operators. And the device can mix a wide variety of ingredients, improves workability by the size and weight reduction of the starting material hoppers, and achieves space saving resulting from the reduction of floor space to half, and easier cleaning.

Although the preferable embodiments are described above, the present disclosure is not limited to be above embodiments but various changes can make without departing from the spirit of the disclosure as defined in the claims. For example, although in the above embodiment it has been explained as that a plurality of the pipe feeder are a eight of the pipe feeders, and along with it, a plurality of the chute are a four of the chutes, it can be set appropriately, and not limited thereto.

In addition, although it has been explained as that there are set two series above and beneath from the first and second starting material hopper, it may be more series.

As the availability in the industry, the present disclosure is applied to a device for weighing a wide variety of ingredients, and a system configuration of the device for weighing a wide variety of ingredients, for the device weighing and feeding several types of ingredients when cup noodles such as instant noodles are packed with the ingredients in a cup.

What is claimed is:

1. A device for weighing a wide variety of ingredients, wherein the device is configured for individually storing at least one kind or several kinds of powdery and granular starting materials in a first starting material hopper and a second starting material hopper, for gradually sending out the respective starting materials to a downstream side of the first starting material hopper and the second starting material hopper which are set up on an upstream side, for weighing, for discharging the respective starting materials in a predetermined amount to first chutes on the downstream side of the first starting material hopper and to second chutes on the downstream side of the second material hopper, and for supplying the respective starting materials to a cup-filling unit, and one first series of first starting material paths defined from downstream the first starting material hopper to the first chutes and one second series of second starting material paths defined from downstream to the second starting material hopper to the second chutes, the first and second starting material paths are formed vertically parallel in the shape of a staircase from the upstream side to the downstream side, and wherein the first and second starting material paths, respectively, comprising:

a plurality of first outlets and a plurality of second outlets, respectively, which are provided below the first starting material hopper and the said second starting material hopper, respectively, a plurality of first pipe feeders and a plurality of second pipe feeders, respectively, in the shape of a rotary cylinder slanted downward to the downstream side, connected correspondingly to the plurality of the first outlets and the plurality of the second outlets, respectively, and configured so that the starting material is provided continuously so as to flow to the downstream side, a plurality of first measuring hoppers with a respective lid and a plurality of second measuring hoppers with a respective lid, respectively, wherein the first pipe feeders and the second pipe feeders, respectively, are provided at each end of the downstream side, a plurality of first measuring sensors and a plurality of second measuring sensors, respectively, each configured to support one of the plurality of the first measuring hoppers and the plurality of the second measuring hoppers, respectively, from below, and to weigh a weight of the first measuring hoppers and the second measuring hoppers with a weight of the starting material, and the first chutes and the second chutes, respectively, provided respectively on the downstream side of the first measuring hoppers and the second measuring hoppers, respectively, whereby material discharged from the first chutes is deposited to separate cups from material discharged from the second chutes.

2. The device for weighing a wide variety of ingredients as defined in claim 1:

wherein the first starting hopper and the second starting hopper, respectively, is provided with a first upper starting hopper, and a second upper starting hopper, respectively, and a first middle starting hopper, and a second middle starting hopper, respectively, and a first lower starting hopper, and a second lower starting hopper, respectively, wherein the lower starting hopper and the second lower starting hopper is provided respectfully at a plurality of the first outlets and at a plurality of the second outlets, wherein the first pipe feeders and the second pip feeders are provided continuously to each of the plurality of the first outlets and the second outlets, respectively, and wherein the second pipe feeders are provided being away from and being overlapped above the first pipe feeders.

3. A system for weighing a wide variety of ingredients comprising:

a pair of devices for weighing a wide variety of ingredients as defined in claim 1 setup face to face with respect to a first cleaning door or a second cleaning door, respectively of two of the devices; and configured to supply the starting material to cup-filling units;

wherein the pair of devices are disposed face to face with an interval of 20~50 cm; and wherein the hoppers, the pipe feeders, and the measuring hoppers are easily removable for cleaning them.

4. The system configuration as defined in claim 3:

wherein the first cleaning door and the second cleaning door is provided in a housing of the respective devices on the back and the forth with respect to a flowing direction of the starting material; and wherein each first cleaning door and each second cleaning door of the pair of the devices, any pair of the first cleaning door and the first cleaning door, or the second cleaning door and the second cleaning door is set up serially in the flowing direction.

5. A system configuration of the device for weighing a wide variety of ingredients as defined in claim 3, comprising:

wherein the first cleaning door and the second cleaning door is provided on the housing of the device for weighing a wide variety of ingredients with respect to the flowing direction of the starting material; and in the each first cleaning door and the each second cleaning door of a pair of the devices for weighing a wide variety of ingredients, any pair of the first cleaning door and the first cleaning door, or the second cleaning door and the second cleaning door is set up parallel in the flowing direction.

6. A device for weighing a wide variety of ingredients as defined in claim 1, comprising:

wherein said first chute and said second chute being spaced apart from one another in a feed direction of the cup-filling unit.

* * * * *